US012802615B2

(12) United States Patent
Lim et al.

(10) Patent No.: US 12,802,615 B2
(45) Date of Patent: Nov. 17, 2026

(54) DISPLAY DRIVER INCLUDING A DISPLAY COMMAND SET SELECTOR AND DISPLAY DEVICE INCLUDING THE SAME

(71) Applicant: LX Semicon Co., Ltd., Daejeon (KR)

(72) Inventors: Kyung Hyun Lim, Daejeon (KR); Sun Wha Koh, Daejeon (KR); Jun Young Lee, Daejeon (KR); Woo Seok Seong, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 19/058,867

(22) Filed: Feb. 20, 2025

(65) Prior Publication Data

US 2025/0265966 A1 Aug. 21, 2025

(30) Foreign Application Priority Data

Feb. 21, 2024 (KR) ........................ 10-2024-0025058
Jan. 31, 2025 (KR) ........................ 10-2025-0012198

(51) Int. Cl.
*G09G 3/20* (2006.01)
*G09G 3/3225* (2016.01)

(52) U.S. Cl.
CPC ......... *G09G 3/2096* (2013.01); *G09G 3/3225* (2013.01); *G09G 2330/021* (2013.01); *G09G 2330/025* (2013.01); *G09G 2330/08* (2013.01); *G09G 2340/0435* (2013.01)

(58) Field of Classification Search
CPC ............................ G09G 3/3225; G09G 3/2096
See application file for complete search history.

(56) References Cited

U.S. PATENT DOCUMENTS

2016/0093267 A1* 3/2016 Lin ......................... H02M 3/07 345/211
2016/0247306 A1 8/2016 Jang et al.
2018/0188868 A1* 7/2018 Park ......................... G09G 3/20
2024/0038138 A1* 2/2024 Kim ..................... G06F 13/4282
2025/0265964 A1* 8/2025 Lim ..................... G09G 3/2092

FOREIGN PATENT DOCUMENTS

CN 108268167 B * 3/2021 ............... G06F 1/24
KR 10-2016-0103364 A 9/2016
KR 10-2021-0101968 A 8/2021

* cited by examiner

*Primary Examiner* — Temesghen Ghebretinsae
(74) *Attorney, Agent, or Firm* — Birch, Stewart, Kolasch & Birch, LLP

(57) ABSTRACT

A display driver and a display device including the same are disclosed. The display driver includes a receiver which receives a display command set (DCS) from outside, a control part which generates a DCS in response to input display information, and a DCS selector which selects between the DCS received from the outside and the DCS generated from the control part.

17 Claims, 5 Drawing Sheets

DISPLAY DRIVER INCLUDING A DISPLAY COMMAND SET SELECTOR AND DISPLAY DEVICE INCLUDING THE SAME

CROSS-REFERENCE TO RELATED APPLICATION

This application claims priority to and the benefit of Korean Patent Application No. 10-2024-0025058 filed in the Republic of Korea on Feb. 21, 2024, and Korean Patent Application No. 10-2025-0012198 filed in the Republic of Korea on Jan. 31, 2025, the entire disclosures of all these applications being hereby expressly incorporated by reference into the present application.

BACKGROUND

1. Field

The present disclosure relates to a display driver and a display device including the same.

2. Discussion of Related Art

Display devices such as a liquid crystal display (LCD) and an organic light emitting diode display (OLED display) include a driving circuit for writing pixel data of input images to pixels of a display panel. As an example of such a driving circuit, a display driver IC (hereinafter referred to as 'DDI') is known.

When refresh rate of the display device is changed or driving mode is changed, the DDI needs to receive Display Command Sets (hereinafter referred to as "DCS") from a processor of an external host system, for example, an application processor (AP).

In video mode, the AP transmits pixel data of input images and timing signals synchronized therewith to the DDI during an active interval, and the DDI immediately converts the received pixel data into data voltages and supplies them to pixels of the display panel. The AP cannot set the DCS while transmitting pixel data during the active interval in the video mode, and may transmit the DCS only during a period without pixel data of input images, for example, during a porch interval of a vertical blank interval. As a result, since there are few DCSs that can be transmitted to the DDI in one frame period, it is difficult for the DDI to properly respond to various driving environments and customer requirements.

Since the DDI must be newly designed to provide new functions of the DDI, the cost of the DDI and the display device increases.

SUMMARY OF THE DISCLOSURE

The present disclosure aims to solve the aforementioned necessity and/or problems.

The present disclosure provides a display driver and a display device including the same that can properly respond to various driving environments and customer requirements.

The objectives of the present disclosure are not limited to those mentioned above, and other objectives not mentioned may be clearly understood by those skilled in the art from the following descriptions.

A display driver according to one exemplary embodiment of the present disclosure, includes: a receiver configured to receive a display command set (DCS) from outside; a control part configured to generate a DCS in response to input display information; and a DCS selector configured to select between the DCS received from the outside and the DCS generated from the control part.

The control part may include a micro control unit (MCU).

The display information may include one or more of a frame frequency of input images, a display brightness value (DBV) indicating a pixel brightness value, and an on pixel ratio (OPR) indicating a ratio of illuminated pixels.

Each of the DCSs may include register settings and parameters necessary for algorithm execution.

While a first DCS level is being set by the DCS received from the outside, a second DCS level may be set by the DCS generated from the control part.

The DCS from the control part may be generated during an active interval during which pixel data of input images are received through the receiver.

The DCS selector sequentially may select between the DCS received from the outside and the DCS generated from the control part according to a predetermined priority to set a DCS level.

The control part may be configured to detect a frame frequency of the input images during a porch interval where there is no pixel data of the input images, and to change DCSs related to the frame frequency during the porch interval.

The control part may be configured to stop operation of a power supply and to reset the display driver in response to a flag signal from the power supply.

The display driver may further include: a plurality of function modules configured to perform different functions by receiving the DCS which is set by the DCS selector.

The control part may include a memory storing a plurality of sets of firmware having different DCSs. The DCS selector may be configured to deliver the DCS read from the memory by the control part to one or more of the function modules.

Updating the firmware may correct a defect in the display driver by changing the DCS stored in the memory.

A display device according to one exemplary embodiment of the present disclosure, includes: a display panel including a plurality of data lines, a plurality of gate lines intersecting the data lines, and a plurality of pixels arranged for displaying input images; an application processor (AP) configured to output a display command set (DCS), pixel data of input images, and timing signals; and a display driver IC (Integrated Circuit) configured to receive the DCS, the pixel data of the input images, and the timing signals from the AP, and to supply data voltages converted from the pixel data to the data lines. The display driver IC includes: a receiver configured to receive a DCS from outside; a micro control unit (MCU) configured to generate a DCS in response to input display information; and a DCS selector configured to select between the DCS received from the outside and the DCS generated from the MCU.

A display device according to another exemplary embodiment of the present disclosure, includes: a display panel including a plurality of data lines, a plurality of gate lines intersecting the data lines, and a plurality of pixels arranged for displaying input images; a data driver configured to convert received pixel data into data voltages and to supply the data voltages to the data lines; a timing controller configured to receive the pixel data of the input images and timing signals, and to transmit the pixel data to the data driver; and a power supply configured to output driving voltages to the display panel, the data driver, and the timing controller. The timing controller includes: a receiver configured to receive the pixel data of the input images, timing signals, external command codes, and display information from a host system; a micro control unit (MCU) configured to generate internal command codes in response to the display information; and a selector configured to select between the external command codes and the internal command codes.

The embodiments of the present disclosure may set the DCS of the DDI using a DCS generated within the DDI using an MCU embedded in the DDI or timing controller. As a result, the present disclosure may provide a display driver and a display device including the same that may properly respond to various driving environments and customer requirements.

The DDI of the present disclosure may set the DCS using the embedded MCU. The DDI or timing controller of the present disclosure may set the DCS using the embedded MCU and convert pixel data of input images into data voltages for output while the host system transmits the pixel data of input images during the active interval. The DDI or timing controller may support various scenario driving methods without relying on the DCS from the AP 200 by using the DCS generated from the embedded MCU.

The DDI or timing controller of the present disclosure may change parameters of corresponding DCS according to a frame frequency (or refresh rate) of input images using the MCU.

The present disclosure may implement a low-power and high-performance DDI and timing controller using real-time adjusted DCS from the MCU embedded in the DDI according to display information.

The DDI or timing controller of the present disclosure may operate according to the DDI's driving environment and customer requirements with changed DCS by firmware update of the embedded MCU. Therefore, the DDI or timing controller of the present disclosure may flexibly respond to various driving environments and customer requirements by providing universal functions and compatibility using the MCU.

The DDI or timing controller of the present disclosure may set DCS not only during the porch interval but also, for example, during the active interval. Therefore, the present disclosure is advantageous for implementing a RAM-less DDI that supports only video mode.

The DDI or timing controller of the present disclosure may reduce power consumption without degrading display quality and performance of the display device according to the DCS generated by the MCU.

The DDI or timing controller of the present disclosure may protect the display panel driver and display panel in abnormal situations such as static electricity.

The effects of the present disclosure are not limited to the effects mentioned above, and other effects not mentioned may be clearly understood by those skilled in the art from the description of the claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION OF THE EMBODIMENTS

Figure 1:
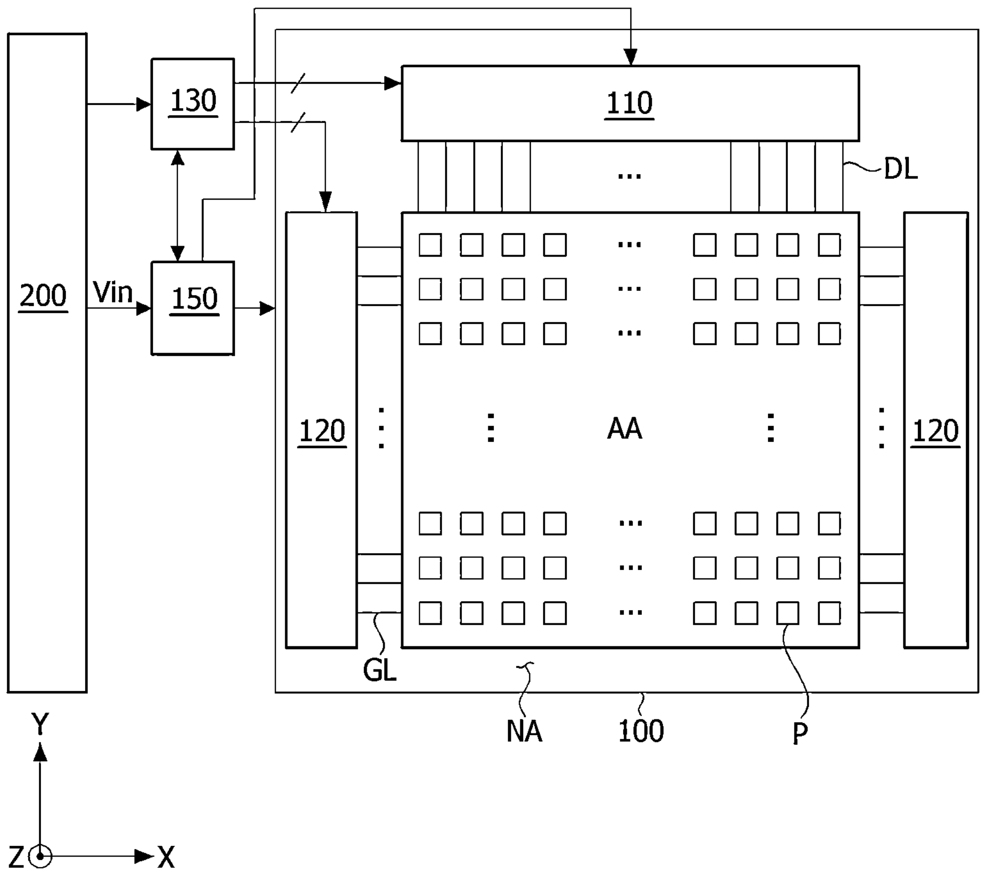
FIG. 1 is a block diagram showing a display device according to an embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "containing" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

In the following embodiments, the DCS (Display Command Set) may include register setting values and parameters for setting internal functions of the DDI or timing controller. The register setting values may include driving timing setting values, voltage values, etc. of digital logic circuits of the DDI or the timing controller. Parameters may be required for various algorithms performed in the DDI. The DCS may be a command code. The DCS level is a DCS classified by function of the DDI or timing controller. Since the DCS levels are grouped by function, they may be interpreted as DCS groups. For example, the first DCS level may include register setting values and parameters for performing the first image quality algorithm. The second DCS level may include register setting values and parameters for performing the second image quality algorithm. The third DCS level may include interface setting values with the host system. The fourth DCS level may include setting values and parameters for power control. In addition, DCS levels necessary for driving digital logic circuits of the DDI or timing controller may be set. These DCSs may vary depending on display information.

Hereinafter, various embodiments of the present disclosure will be described in detail with reference to the accompanying drawings.

Figure 2:
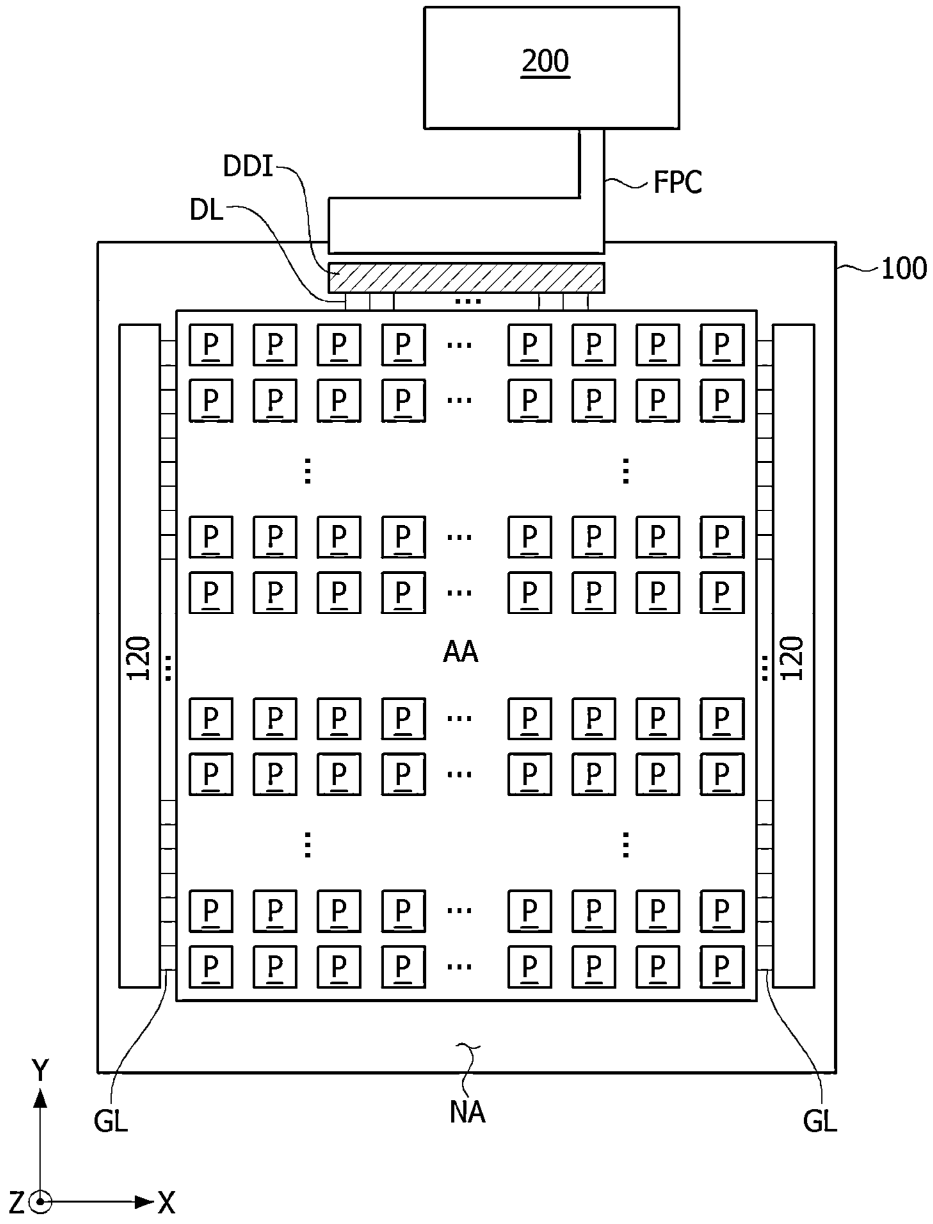
FIG. 2 is a diagram showing an example of the DDI connected to the display panel.

Referring to FIGS. 1 and 2, the display device according to an embodiment of the present disclosure includes a display panel 100 and a display panel driver for writing pixel data of input images to pixels of the display panel 100.

The display panel 100 may be a rectangular panel structure having a length (or width) in the X-axis direction, a length in the Y-axis direction, and a thickness in the Z-axis direction. The display panel 100 includes a display area AA that displays input images on the screen. The display area AA includes a plurality of data lines DL, a plurality of gate lines GL intersecting with the data lines DL, and pixels P arranged in a matrix form defined by the data lines DL and gate lines GL.

Each of the pixels P may be divided into red sub-pixels, green sub-pixels, and blue sub-pixels for color implementation. Each pixel may additionally include a white sub-pixel. Each sub-pixel includes a pixel circuit. The sub-pixels may include color filters, but these may be omitted. Hereinafter, a pixel may be interpreted to have the same meaning as a sub-pixel. In the case of an OLED display, the pixel circuit may include a driving transistor that drives the light-emitting element, a storage capacitor that stores the gate-source voltage of the driving transistor, and a plurality of switch transistors. The light-emitting element may be an OLED (Organic Light-emitting diode).

The display panel may be implemented as an LTPO (Low-Temperature Polycrystalline Oxide) panel. The LTPO panel is implemented using backplane technology that includes LTPS (Low-Temperature Polycrystalline Silicon) and IGZO (Indium Gallium Zinc Oxide) as semiconductor layers for transistors, while combining their advantages. LTPS may increase the electron mobility of TFTs (Thin Film Transistors), and IGZO may implement oxide TFTs that are advantageous for power consumption due to low leakage current. When driving an LTPO panel with Variable Refresh Rate (VRR), power consumption may be reduced without image quality degradation by dynamically adjusting the refresh rate according to the content characteristics of the input image.

Touch sensors may be arranged on the screen of the display panel 100. The touch sensors may be implemented as on-cell type or add-on type sensors arranged on the screen of the display panel, or as in-cell type touch sensors embedded in the display area AA.

The display panel driver visually reproduces the input images on the display area AA of the display panel 100 by writing pixel data of the input images to the pixels P. The display panel driver includes a data driver 110, a gate driver 120, and a timing controller 130. The display panel driver may further include a touch sensor driver. The touch sensor driver drives the touch sensors, determines touch input by comparing output signals from the touch sensors with a predetermined threshold value, and transmits coordinate data of the touch input to the host system.

The data driver 110 includes a digital circuit part that receives pixel data of input images from the timing controller 130, and an analog circuit part that generates data voltages Vdata by converting the pixel data into gamma-compensated voltage using a Digital to Analog Converter (hereinafter referred to as "DAC"). The gamma reference voltage input from the power supply 150 is input to the voltage distribution circuit of the data driver 110, and the voltage distribution circuit may generate gamma-compensated voltages for each gray level by dividing the gamma reference voltage and provide them to the DAC. The data voltages of the pixel data output from the data driver 110 are supplied to the data lines DL.

The gate driver 120 may be arranged in the non-display areas NA on both sides outside the display area AA, but is not limited thereto. Under the control of the timing controller 130, the gate driver 120 sequentially outputs gate pulses of the gate signal to the gate lines GL in units of pixel lines in the X-axis direction. The gate driver 120 may sequentially supply the gate signals to the gate lines GL by shifting the gate signals using a shift register. The pixels P of the display panel 100 charge the data voltages which are synchronized with the pulses of the gate signals when the gate signals are applied in pixel line units in the X-axis direction.

The timing controller 130 receives pixel data of input images and timing signals synchronized with the pixel data from the host system 200. The timing signals include a vertical sync signal Vsync, a horizontal sync signal Hsync, a data enable signal DE, etc. One period of the vertical synchronization signal Vsync corresponds to one frame period. One period of the horizontal sync signal Hsync and the data enable signal DE is one horizontal period 1H. The pulse of the data enable signal DE is synchronized with one line of data to be written to the pixels of one pixel line. Since the frame period and the horizontal period may be determined by counting the data enable signals DE, the vertical sync signal Vsync and the horizontal sync signal Hsync may be omitted.

The timing controller 130 may determine the frame frequency of input images by counting pulses of the horizontal sync signal Hsync or data enable signal DE received from the host system 200. Meanwhile, in the MIPI DSI (Mobile Industry Processor Interface Display Serial Interface) protocol, the timing controller 130 or DDI may determine the frame frequency of input images based on through the DCS (Display Command Set) register that is changed by the host system 200, for example, AP (Application Processor) whenever the frame frequency is changed.

The host system 200 may be a main circuit board of a TV (Television) system, set-top box, navigation system, personal computer (PC), vehicle system, home theater system, mobile device, or wearable device. In mobile devices or wearable devices, as shown in FIG. 2, the timing controller 130 and data driver 110 may be integrated into a single DDI. The DDI may receive pixel data and timing signals of input images from the host system 200 and output the pixel data processed in the digital circuit part as data voltages. The data voltages output from the DDI is supplied to the data lines DL.

The DDI may further include a touch sensor driver (omitted from the drawings) and the power supply 150. The host system 200 may execute applications or process data corresponding to touch input in response to touch input coordinate data input from the touch sensor driver.

In mobile devices, the host system 200 may be implemented as an application processor (AP). While the host system 200 is described as an AP hereinafter, it is not limited thereto. The AP 200 may transmit timing signals of pixel data of input images to the DDI through a mobile industry processor interface (MIPI). The DDI may be directly bonded to the display panel 100 in a chip on glass (COG) process or mounted on a flexible film and bonded to the display panel 100 in a chip on film (COF) form. In FIG. 2, a flexible printed circuit board (FPCB) is connected between the AP 200's circuit board and the display panel 100 to electrically connect the AP 200 to the DDI.

The timing controller 130 generates data timing control signals for controlling operation timing of the data driver 110 and gate timing control signals for controlling operation timing of the gate driver 120 based on timing signals Vsync, Hsync, and DE received from the AP 200.

The display panel driver may be driven at variable refresh rate (VRR) under the control of the timing controller 130. For example, the timing controller 130 may analyze input images and reduce the refresh rate to reduce power consumption of the display device when there is no change in the input images for a preset time. In this case, when still images are input for more than a certain time, the display panel driver may reduce power consumption of the display device by controlling the data writing period to be longer by lowering the refresh rate of pixels P under the control of the timing controller 130. When the display device operates in standby mode or in response to a user command, the driving circuit of the display panel 100 may have a lower refresh rate. Additionally, the refresh rate may be lowered in an always on display (AOD) screen. The AOD screen may be either a partial pixel area of the display area AA where preset information such as battery level and time is displayed in standby mode, or an auxiliary display area electrically connected to the display area AA.

The power supply 150 may include a charge pump, regulator, buck converter, boost converter, and the like. The power supply 150 adjusts a DC input voltage Vin input from the AP 200 to output constant voltages (or DC voltages) necessary for driving the data driver 110, the gate driver 120, timing controller 130, and display panel 100. The power supply 150 may output constant voltages such as gamma reference voltages, high and low level voltages of gate signals, constant voltages necessary for driving pixels P, and IC driving voltages. The power supply 150 may support Over Current Protection (hereinafter referred to as 'OCP'). The power supply 150 may sense overcurrent situations, for example, static electricity or electro static discharge (ESD), to generate a flag signal. The power supply 150 may be implemented as a power management integrated circuit (PMIC) but is not limited thereto.

The power supply 150 may transmit the flag signal to the timing controller 130 or DDI. Additionally, the flag signal from the power supply 150 may be transmitted to the AP 200. In response to the flag signal from the power supply 150, the timing controller 130, DDI, and AP 200 stop the operation of the power supply 150 and stop the operation of the data driver 110 and gate driver 120 to prevent abnormal screens from being displayed on the display panel 100 and protect the display panel driver circuit from overcurrent.

Figure 3:
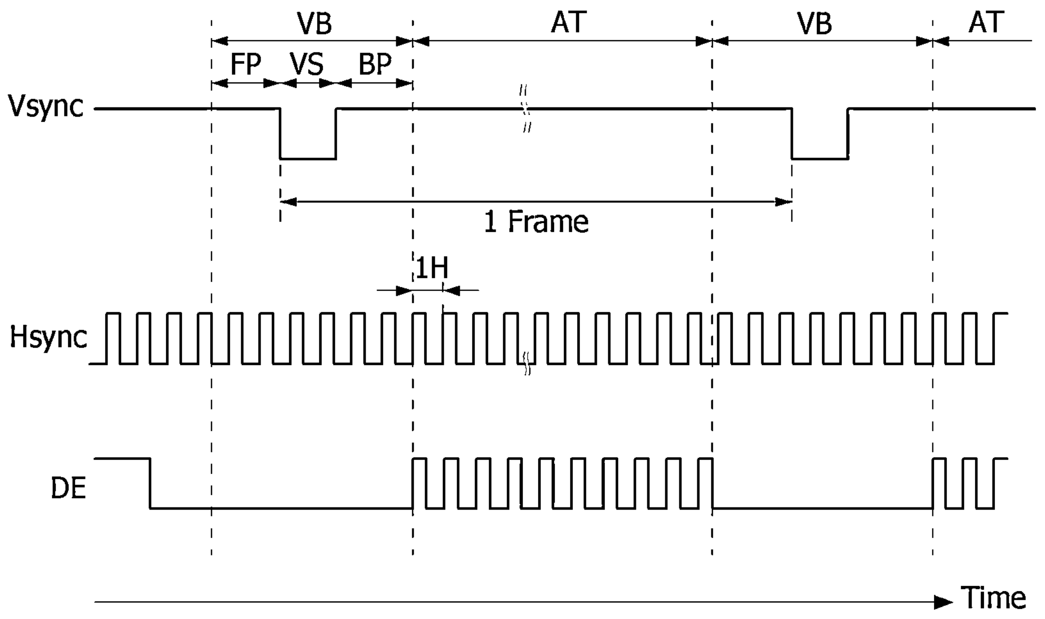
FIG. 3 is a diagram showing one frame period.

FIG. 3 is a diagram showing one frame period. In FIG. 3, the vertical sync signal Vsync, horizontal sync signal Hsync, and data enable signal DE are timing signals synchronized with pixel data of the input images.

Referring to FIG. 3, one frame period (1 Frame) is divided into an active interval (Active interval, AT) and a vertical blank interval (Vertical Blank interval, VB) where there is no pixel data. The vertical blank interval VB includes a sync interval (Vertical sync, VS), a vertical front porch interval (Vertical Front Porch, VFP), and a vertical back porch interval (Vertical Back Porch, VBP).

Pixel data of input images are input to the timing controller 130 during the active interval AT, and the data driver 110 may output data voltages. The vertical blank interval VB is a period without pixel data between the active interval AT of the N−1-th frame period (where N is a natural number) and the active interval AT of the N-th frame period. While the data driver 110 or DDI outputs data voltages during the active interval AT, the data driver 110 or DDI does not output data voltages during the vertical blank interval VB. When the refresh rate is lowered, the vertical blank interval VB may be extended to become longer.

The vertical sync signal Vsync defines one frame period. One pulse period of the horizontal sync signal Hsync and data enable signal DE corresponds to one horizontal period (1H). The data enable signal DE defines the valid data interval where pixel data exists.

Figure 4:
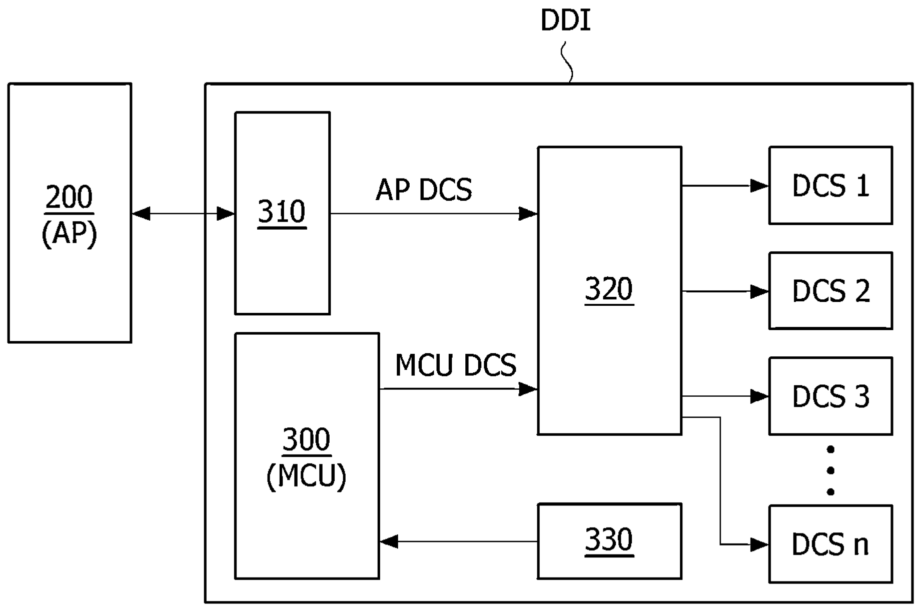
FIG. 4 is a block diagram showing an MCU and a DCS selector embedded in the DDI according to an embodiment of the present disclosure.

FIG. 4 is a block diagram showing an MCU and a DCS selector embedded in the DDI according to an embodiment of the present disclosure.

Referring to FIG. 4, the DDI includes a receiver 310, a control part 300, and a DCS selector 320. The DDI may be the timing controller 130 in FIG. 1.

The AP 200 transmits the display command set (DCS) through MIPI. The receiver 310 receives the DCS from the AP 200 through MIPI and delivers it to the DCS selector 320. The receiver 310 may include a synchronization circuit that converts the MIPI interface clock to the DDI's internal clock to output DCS data.

The control part 300 is embedded in the DDI and generates an internal DCS (MCU DCS) separately from the AP 200 according to display information. The DCS generated from the control part 300 is provided to the DCS selector 320. The control part 300 may change the DCS according to the display information 330. The display information may be stored in the memory including input image frame frequency (or refresh rate), display brightness value (DBV) indicating pixel brightness value, on pixel ratio (OPR) indicating the ratio of illuminated pixels, input image resolution, color temperature characteristics, and the like. At least some of the display information, for example, input image frame frequency (or refresh rate), DBV, OPR, etc., may be updated in real-time according to the DCS input from the AP 200. When the display information changes, for example, when the input image frame frequency changes, the DCS output from the control part 300 may change.

The control part 300 may be implemented as a micro control unit (MCU). While the control part 300 is described as an MCU hereinafter, it is not limited thereto. The MCU 300 includes a CPU (Central Processing Unit), memory, timer, counter, communication interface, etc., which can independently generate the DCS and process data. The memory may include a non-volatile memory such as ROM/Flash memory and a volatile memory such as RAM. The memory of the MCU 300 may share existing memory embedded in the DDI or timing controller (TCON). Hereinafter, the description will be made with regard to an embodiment where the MCU 300 is embedded in the DDI. However, the present disclosure is not limited thereto. For example, the timing controller (TCON) may include the MCU 300 that generates the DCS (or command codes) and sets the DCS.

The DCS selector 320 sets the DCS with one or more of the DCS input from the AP 200, AP DCS, and the DCS input from the MCU 300, MCU DCS. The DCS selector 320 may set first to n-th DCS levels, DCS1-DCSn (where n is a positive integer of 2 or more) according to the DCSs from the AP 200 and the MCU 300.

The DDI of the present disclosure may generate a DCS using the embedded MCU. The DDI of the present disclosure may set the DCS using the DCS, MCU DCS, generated from the embedded MCU 300 and convert pixel data of input images into data voltages for output while the AP 200 transmits pixel data of input images during the active interval in video mode. The DDI may support driving methods in various scenarios without relying on the DCS from the AP 200 by using the DCS generated from the embedded MCU 300.

A plurality of sets of DCSs may be needed according to the display information. For example, a parameter 'A' of the DCS may be set to different values according to the frame frequencies (or refresh rates) of input images. In this case, while a DCS with a parameter A corresponding to each frame frequency needs to be stored in the memory, when the MCU 300 is embedded in the DDI, a parameter A may be modified by the MCU 300 in accordance with the frame frequencies (or refresh rates) of the input image, allowing real-time response to frame frequencies (or refresh rates) changes with just a single DCS. Therefore, the DDI of the present disclosure may minimize the number of DCS commands that need to be stored.

The present disclosure may implement a low-power and high-performance DDI utilizing real-time adjusted DCS from the MCU embedded in the DDI according to the display information. For example, when one or more of input image frame frequency (or refresh rate), DBV, and OPR decrease, the MCU 300 may drive the DDI in low-power mode.

When the MCU 300 is embedded in the DDI, defects or malfunctions of the DDI can be resolved using the DCS generated from the MCU 300. The MCU 300 may transmit the DCS defined by firmware to the DCS selector 320. The DCS selector 320 may set the DCS of digital logic circuits with changed DCS by firmware update to drive the DDI with the DCS optimized for current driving environment and customer requirements, or fix DDI defects. The present disclosure may fix hardware defects of the DDI by changing DCS through firmware update by the MCU 300 without redesigning the DDI. Therefore, the DDI of the present disclosure may flexibly respond to various driving environments and customer requirements by providing universal functions and compatibility using the MCU.

When operating in video mode, the DDI including the MCU 300 may transmit DCS not only during the porch period but also, for example, during the active period through the MCU 300. Therefore, the DDI of the present disclosure is advantageous for implementing a RAM-less DDI that supports only video mode.

Figure 5:
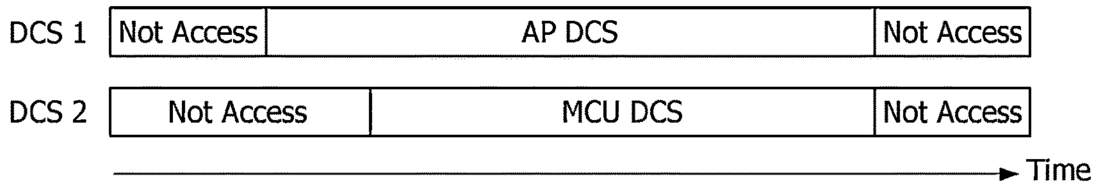
FIG. 5 is a diagram which illustrates an example where an AP and a MCU of a DDI set different DCSs in parallel.

FIG. 5 is a diagram which illustrates an example where an AP and a MCU of a DDI set their different DCSs in parallel. In FIG. 5, "Not Access" indicates a DCS non-setting interval where the DCS register is not being accessed.

Referring to FIG. 5, the DCS selector 320 may set a first DCS level DCS1 with the DCS input from the AP 200 AP DCS and set a second DCS level DCS2 with the DCS input from the MCU 300 MCU DCS. Within one frame period, for at least a portion of time, the AP 200 may access register settings and parameters of a first DCS level DCS1 from the memory while simultaneously the MCU 300 may access register settings and parameters of a second DCS level DCS2 from the memory. At this time, the first DCS level DCS1 may be set by the AP 200 simultaneously with the second DCS level DCS2 being set by the MCU 300.

Figure 6A:
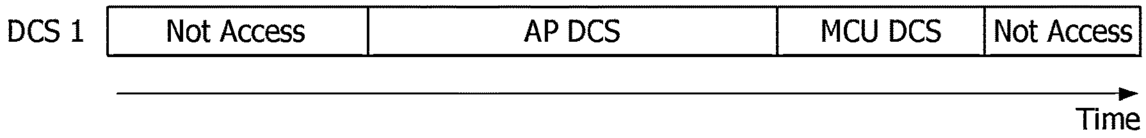
FIGS. 6A and 6B are drawings illustrating examples where the AP and the MCU of the DDI set the same DCS in time division.
Figure 6B:
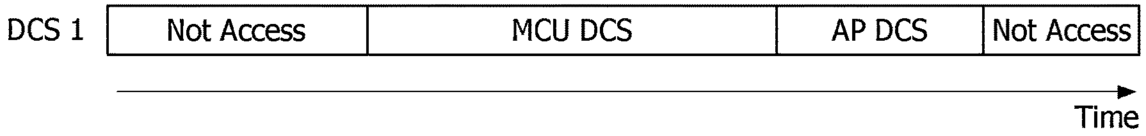

FIGS. 6A and 6B are drawings illustrating examples where the AP and the MCU of the DDI set the same DCS in time division.

When the AP 200 and the MCU 300 access registers that are set to the same DCS level, the DCS selector 320 may allow access according to a predetermined priority. For example, as shown in FIG. 6A, after the first DCS level DCS1 is set by the DCS input from the AP 200, AP DCS, the first DCS level DCS1 may be set as the DCS input from the MCU 300, MCU DCS, by the DCS selector 320. In another embodiment, as shown in FIG. 6B, after the first DCS level DCS1 is set by the DCS input from the MCU 300, MCU DCS, the first DCS level DCS1 may be set as the DCS input from the AP 200, AP DCS, by the DCS selector 32.

Figure 7:
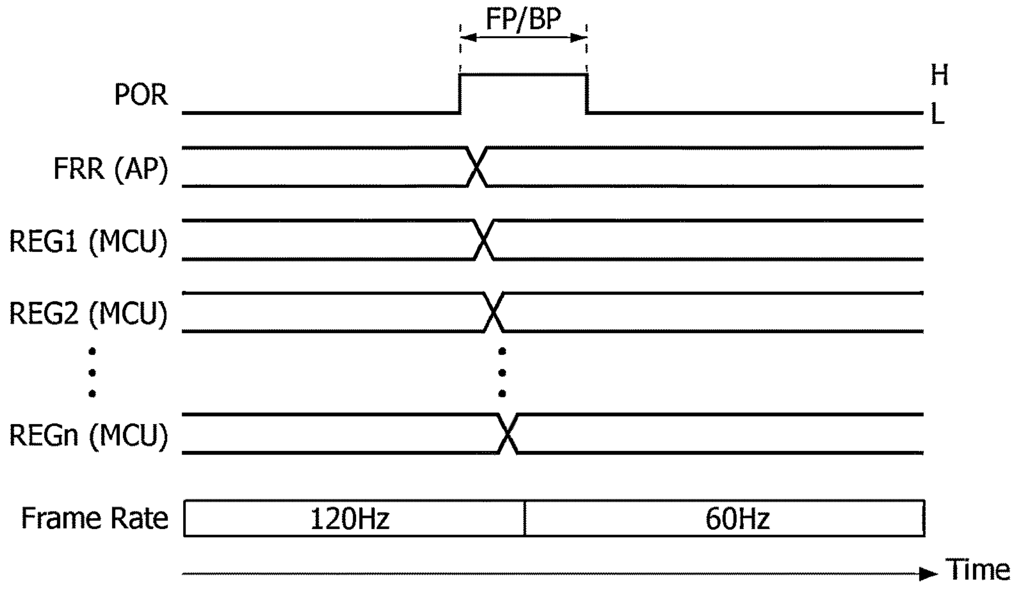
FIG. 7 is a diagram which illustrates an example where the AP and the MCU cooperatively set the DCS.

FIG. 7 is a diagram which illustrates an example where the AP and the MCU cooperatively set the DCS. In FIG. 7, "POR" is a porch signal that is generated in synchronization with the vertical sync signal Vsync and indicates the vertical porch interval VBP/VFP of the vertical blank interval VB. The porch interval VBP/VFP may include one or more of the front porch interval VFP and the back porch interval VBP. The DDI may transmit the porch signal POR to the AP 200 to inform the AP 200 of the display status, enabling the AP 200 to determine new data transmission timing. In another embodiment, the AP 200 may transmit the porch signal POR to the DDI. The output "Frame Rate" is the frame frequency when the refresh rate changes from 120 Hz to 60 Hz.

Referring to FIG. 7, the AP 200 may transmit a signal FRR (AP) indicating frame frequency change to the DDI during the porch interval FP/BP. The MCU 300 may detect the frame frequency change signal FRR (AP) received from the AP 200 and modify DCS settings REG (MCU) to RGEn (MCU) related to the frame frequency within the porch interval FP/BP. After all DCS settings REG1 (MCU) to REGn (MCU) have been modified to match the changed frame frequency, the DDI operates at the modified frame frequency.

Figure 8:
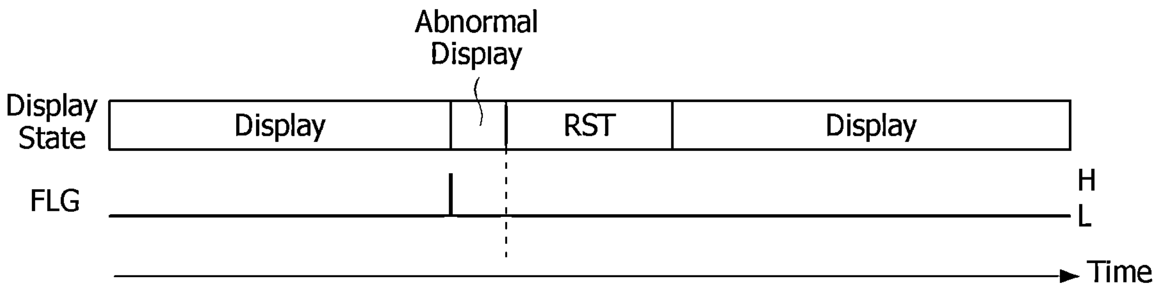
FIG. 8 is a diagram which illustrates an example of error detection and DDI reset using the MCU.

FIG. 8 is a diagram which illustrates an example of error detection and DDI reset using the MCU. In FIG. 8, "Abnormal Display" indicates the occurrence of an abnormal screen that may be visible to users when the power failure occurs. Power failure includes situations where input and output voltages of the power supply 150 are abnormally changed or static electricity (ESD) occurs. When static electricity is applied to the display panel and its driving circuit during power failure, circuit elements may be damaged and signal lines may be disconnected or short-circuited.

Referring to FIG. 8, the power supply 150 may generate a flag signal FLG when a power failure is detected by real-time sensing of overcurrent at input and output terminals. The flag signal may be transmitted to one or more of the timing controller 130, DDI, and AP 200. The MCU 300 of the DDI responds to the flag signal FLG from the power supply 150 by stopping the operation of the power supply 150 and resetting the DDI. Therefore, even if a reset command from the AP 200 is not received during a power failure, the DDI can be reset (RST) by the MCU 300 and restarted to drive the display panel 100 normally without outputting an abnormal screen.

Figure 9:
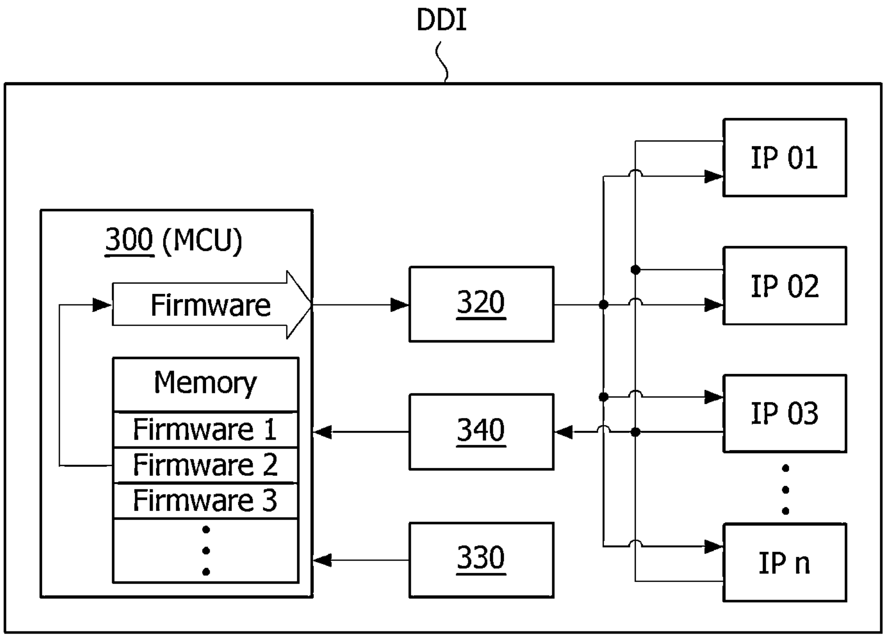
FIG. 9 is a diagram which illustrates an example of MCU firmware update.

FIG. 9 is a diagram which illustrates an example of the MCU firmware update.

Referring to FIG. 9, the digital circuit part of the DDI includes functional modules IP01-IPn that perform various functions such as algorithm execution, display functions, power management, and interface settings. Each of the functional modules IP01-IPn includes a digital logic circuit. The digital logic circuit operates by receiving register settings and parameter values defined by the DCS, and its operation may be modified accordingly when the DCS is changed.

The DDI may further include an interface module 340 connected between the functional modules IP01 to IPn and the MCU 300.

The MCU 300 may store a plurality of sets of firmware Firmware 1 to Firmware 3 in memory that are selected in response to display information 330, operating environment, and customer requirements. Each set of firmware Firmware 1 to Firmware 3 of the MCU 300 may include register settings and parameters of the DCS categorized by various driving scenarios with different display information 330, operating environments, and customer requirements. The sets of firmware Firmware 1 to Firmware 3 of the MCU 300 may be updated or added according to the display information 330, operating environment, and customer requirements through an external interface where user commands/data are input.

The functional modules IP01 to IPn may generate operation status signals indicating their operation when operating in specific scenarios such as image quality algorithm, frame frequency (or refresh rate) change, color coordinate change, brightness change, and power mode change. The interface module 340 transmits the operation status signals input from the functional modules IP01 to IPn to the MCU 300, and the MCU 300 reads the firmware Firmware 1 to Firmware 3 corresponding to the operational status of the functional modules IP01-IPn from memory and provides the DCS of the selected firmware to the DCS selector 320. The DCS selector 320 transmits the DCS input from the MCU 300 to one or more corresponding functional modules IP01 to IPn. Therefore, the MCU may optimize DDI operation by selecting the DCS optimized for the current operational status of the functional modules IP01 to IPn, and may flexibly respond to various operational scenarios of the DDI.

The content described in the specification regarding the problems to be solved, means for solving the problems, and effects does not specify essential features of the claims, therefore the scope of the claims is not limited by the content described in the specification.

While the embodiments of the present invention have been described in detail with reference to the accompanying drawings, the present invention is not limited to these embodiments and may be implemented in various modified forms within the scope that does not depart from the technical spirit of the present invention. Therefore, the embodiments disclosed in the present invention are not intended to limit the technical spirit of the present invention but to explain it, and the scope of the technical spirit of the present invention is not limited by these embodiments. Therefore, the embodiments described above should be understood as being exemplary in all aspects and not limiting.

What is claimed is:

1. A display driver comprising:

a receiver configured to receive a display command set (DCS) from outside;

a control part configured to generate a DCS in response to input display information; and a DCS selector configured to select between the DCS received from the outside and the DCS generated from the control part, wherein each of the DCSs includes register settings and parameters necessary for algorithm execution.

2. The display driver according to claim 1, wherein the control part includes a micro control unit (MCU).

3. The display driver according to claim 1, wherein the display information includes one or more of a frame frequency of input images, a display brightness value (DBV) indicating a pixel brightness value, and an on pixel ratio (OPR) indicating a ratio of illuminated pixels.

4. The display driver according to claim 1, wherein while a first DCS level is being set by the DCS received from the outside, a second DCS level is set by the DCS generated from the control part.

5. The display driver according to claim 1, wherein the DCS from the control part is generated during an active interval during which pixel data of input images are received through the receiver.

6. The display driver according to claim 1, wherein the DCS selector sequentially selects between the DCS received from the outside and the DCS generated from the control part according to a predetermined priority to set a DCS level.

7. The display driver according to claim 1, wherein the control part is configured to detect a frame frequency of input images during a porch interval where there is no pixel data of the input images, and to change DCSs related to the frame frequency during the porch interval.

8. The display driver according to claim 1, wherein the control part is configured to stop operation of a power supply and to reset the display driver in response to a flag signal from the power supply.

9. The display driver according to claim 1, further comprising:

a plurality of function modules configured to perform different functions by receiving the DCS which is set by the DCS selector.

10. The display driver according to claim 9, wherein:

the control part includes a memory storing a plurality of sets of firmware having different DCSs, and the DCS selector is configured to deliver the DCS read from the memory by the control part to one or more of the function modules.

11. The display driver according to claim 10, wherein updating the firmware corrects a defect in the display driver by changing the DCS stored in the memory.

12. A display device comprising:

a display panel including a plurality of data lines, a plurality of gate lines intersecting the data lines, and a plurality of pixels arranged for displaying input images;

an application processor (AP) configured to output a display command set (DCS), pixel data of input images, and timing signals;

a display driver integrated circuit (IC) configured to receive the DCS, the pixel data of the input images, and the timing signals from the AP, and to supply data voltages converted from the pixel data to the data lines; and a power supply configured to output constant voltages necessary for driving the display panel and the display driver IC, wherein the display driver IC includes:

a receiver configured to receive a DCS from outside;

a micro control unit (MCU) configured to generate a DCS in response to input display information; and a DCS selector configured to select between the DCS received from the outside and the DCS generated from the MCU, and wherein the MCU is configured to stop operation of the power supply and to reset the display driver IC in response to a flag signal from the power supply.

13. The display device according to claim 12, wherein:

the display information includes one or more of a frame frequency of the input images, a display brightness value (DBV) indicating a pixel brightness value, and an on pixel ratio (OPR) indicating a ratio of illuminated pixels, and each of the DCSs includes register settings and parameters necessary for algorithm execution.

14. A display device comprising:

a display panel including a plurality of data lines, a plurality of gate lines intersecting the data lines, and a plurality of pixels arranged for displaying input images;

a data driver configured to convert received pixel data into data voltages and to supply the data voltages to the data lines;

a timing controller configured to receive the pixel data of the input images and timing signals, and to transmit the pixel data to the data driver; and a power supply configured to output driving voltages to the display panel, the data driver, and the timing controller, wherein the timing controller includes:

a receiver configured to receive the pixel data of the input images, timing signals, external command codes, and display information from a host system;

a micro control unit (MCU) configured to generate internal command codes in response to the display information; and a selector configured to select between the external command codes and the internal command codes, and wherein:

the display information includes one or more of a frame frequency of the input images, a display brightness value (DBV) indicating a pixel brightness value, and an on pixel ratio (OPR) indicating a ratio of illuminated pixels, and the external command codes and the internal command codes include register settings and parameters necessary for algorithm execution.

15. The display device according to claim 14, wherein the MCU is configured to output the internal command codes during an active interval during which the pixel data of the input images are received through the receiver.

16. The display device according to claim 14, wherein:

the MCU is configured to detect the frame frequency of the input images during a porch interval where there is no pixel data of the input images, and to change the internal command codes related to the frame frequency during the porch interval.

17. The display device according to claim 14, wherein:

the power supply is configured to generate a flag signal when overcurrent is detected, and the MCU is configured to stop operation of the power supply and to reset the timing controller in response to the flag signal.

* * * * *